(12) United States Patent
Baldwin et al.

(10) Patent No.: US 10,578,793 B2
(45) Date of Patent: Mar. 3, 2020

(54) COLOR-SCANNING GRATING-BASED BACKLIGHT AND ELECTRONIC DISPLAY USING SAME

(71) Applicant: LEIA INC., Menlo Park, CA (US)

(72) Inventors: James A. Baldwin, Menlo Park, CA (US); David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 162 days.

(21) Appl. No.: 15/799,953

(22) Filed: Oct. 31, 2017

(65) Prior Publication Data
US 2018/0067251 A1   Mar. 8, 2018

Related U.S. Application Data

(63) Continuation of application No. PCT/US2015/030051, filed on May 9, 2015.

(51) Int. Cl.
*F21V 8/00* (2006.01)
*G02B 5/18* (2006.01)
(Continued)

(52) U.S. Cl.
CPC ......... *G02B 6/0068* (2013.01); *G02B 5/1866* (2013.01); *G02B 6/0036* (2013.01);
(Continued)

(58) Field of Classification Search
CPC .. G02B 5/1866; G02B 6/0036; G02B 6/0038; G02B 6/0068; G02F 2001/133622; G02F 2201/305
See application file for complete search history.

(56) References Cited

U.S. PATENT DOCUMENTS

| 5,615,024 A | 3/1997 | May et al. |
| 5,617,248 A | 4/1997 | Takahashi et al. |

(Continued)

FOREIGN PATENT DOCUMENTS

| CN | 1213097 A | 4/1999 |
| CN | 1619373 A | 5/2005 |

(Continued)

OTHER PUBLICATIONS

Chen, C.-F., "LEDs for liquid cyrstal display (LCD) backlighting—Part 1," EDN Network, Jan. 6, 2015, 11 pages, Elsevier, Inc.
(Continued)

*Primary Examiner* — Evan P Dzierzynski
(74) *Attorney, Agent, or Firm* — J. Michael Johnson

(57) ABSTRACT

Color-scanning grating-based backlighting includes a color scanning protocol to provide different colors of light in different regions of a plate light guide with an intervening dark region. A color-scanning grating-based backlight includes the plate light guide and a diffraction grating configured to diffractively couple out a portion of a guided light beam as a coupled-out light beam directed away from a plate light guide surface at a predetermined principal angular direction. The backlight further includes a multi-color light source configured to provide the different colors of light to the plate light guide as the guided light beam according to the color scanning protocol. Provided light of a first color in a first region is separated from provided light of a second color in a second region one or both by the intervening dark region and by a light-confining wall of the plate light guide.

23 Claims, 7 Drawing Sheets

(51) Int. Cl.
*H05B 33/08* (2020.01)
*G02F 1/1335* (2006.01)

(52) U.S. Cl.
CPC ......... *G02B 6/0038* (2013.01); *G02B 6/0073* (2013.01); *H05B 33/086* (2013.01); *G02F 2001/133622* (2013.01); *G02F 2201/305* (2013.01)

(56) References Cited

U.S. PATENT DOCUMENTS

| | | | |
|---|---|---|---|
| 5,721,598 | A | 2/1998 | Smith |
| 5,729,311 | A | 3/1998 | Broer et al. |
| 5,926,294 | A | 7/1999 | Sato et al. |
| 6,097,352 | A | 8/2000 | Zavracky et al. |
| 6,324,330 | B1 | 11/2001 | Stites |
| 6,580,529 | B1 | 6/2003 | Amitai et al. |
| 6,667,819 | B2 | 12/2003 | Nishikawa et al. |
| 6,980,271 | B2 | 12/2005 | Fujishiro |
| 7,114,820 | B1 | 10/2006 | Parikka et al. |
| 7,413,334 | B2 | 8/2008 | Baba |
| 7,742,120 | B2 | 6/2010 | Bayley et al. |
| 7,773,849 | B2 | 8/2010 | Shani |
| 7,903,332 | B2 | 3/2011 | De Zwart et al. |
| 8,026,997 | B2 | 9/2011 | Feng |
| 8,154,508 | B2 | 4/2012 | Wang et al. |
| 8,251,563 | B2 | 8/2012 | Papakonstantinou et al. |
| 8,619,363 | B1 | 12/2013 | Coleman |
| 8,681,423 | B1 | 3/2014 | Gibson et al. |
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 2002/0008834 | A1 | 1/2002 | Suzuki |
| 2002/0075427 | A1 | 6/2002 | Colgan et al. |
| 2002/0075445 | A1 | 6/2002 | Dabrowski et al. |
| 2003/0086649 | A1 | 5/2003 | Zhou |
| 2004/0130879 | A1 | 7/2004 | Choi et al. |
| 2004/0156182 | A1 | 8/2004 | Hatjasalo et al. |
| 2004/0156589 | A1 | 8/2004 | Gunn et al. |
| 2005/0007757 | A1 | 1/2005 | Leu et al. |
| 2005/0041174 | A1 | 2/2005 | Numata et al. |
| 2005/0073627 | A1 | 4/2005 | Akiyama |
| 2005/0123229 | A1 | 6/2005 | Huck et al. |
| 2005/0140832 | A1 | 6/2005 | Goldman et al. |
| 2005/0140848 | A1* | 6/2005 | Yoo .................. G02B 6/0043 349/64 |
| 2005/0201122 | A1 | 9/2005 | Shinohara et al. |
| 2005/0264717 | A1 | 12/2005 | Chien et al. |
| 2006/0038769 | A1 | 2/2006 | Marra et al. |
| 2006/0008347 | A1 | 4/2006 | Winkler |
| 2006/0104570 | A1 | 5/2006 | Rausch |
| 2007/0058394 | A1 | 3/2007 | Yu |
| 2007/0129864 | A1 | 6/2007 | Tanaka et al. |
| 2007/0213955 | A1 | 9/2007 | Ishida et al. |
| 2007/0279367 | A1 | 12/2007 | Kitai |
| 2007/0298533 | A1 | 12/2007 | Yang et al. |
| 2008/0204663 | A1 | 8/2008 | Balogh |
| 2008/0204873 | A1 | 8/2008 | Daniell |
| 2008/0225393 | A1 | 9/2008 | Rinko |
| 2008/0285307 | A1 | 11/2008 | Aylward et al. |
| 2008/0297696 | A1 | 12/2008 | Banerjee |
| 2008/0304535 | A1 | 12/2008 | Parriaux et al. |
| 2009/0091837 | A1 | 4/2009 | Chao et al. |
| 2009/0129116 | A1 | 5/2009 | Kim et al. |
| 2009/0207342 | A1 | 8/2009 | Yamaguchi et al. |
| 2009/0213300 | A1 | 8/2009 | Daiku |
| 2009/0244706 | A1 | 10/2009 | Levola et al. |
| 2009/0278789 | A1 | 11/2009 | Declercq et al. |
| 2009/0290837 | A1 | 11/2009 | Chen et al. |
| 2009/0322986 | A1 | 12/2009 | Wei et al. |
| 2010/0039832 | A1 | 2/2010 | Ahlgren et al. |
| 2010/0103485 | A1 | 4/2010 | Haussler |
| 2010/0118117 | A1 | 5/2010 | Kroll et al. |
| 2010/0123952 | A1 | 5/2010 | Chen et al. |
| 2010/0207964 | A1 | 8/2010 | Kimmel et al. |
| 2010/0284085 | A1 | 11/2010 | Laakkonen |
| 2010/0289870 | A1 | 11/2010 | Leister |
| 2010/0302803 | A1 | 12/2010 | Bita et al. |
| 2010/0321781 | A1 | 12/2010 | Levola et al. |
| 2011/0002143 | A1 | 1/2011 | Saarikko et al. |
| 2011/0134347 | A1 | 6/2011 | Brott et al. |
| 2011/0141395 | A1* | 6/2011 | Yashiro .................. G02B 6/0036 349/62 |
| 2011/0149596 | A1 | 6/2011 | Lv et al. |
| 2011/0157257 | A1 | 6/2011 | Bennett et al. |
| 2011/0157667 | A1 | 6/2011 | Lacoste et al. |
| 2011/0182570 | A1 | 7/2011 | Yeh |
| 2011/0241573 | A1 | 10/2011 | Tsai et al. |
| 2011/0242837 | A1 | 10/2011 | Cornelissen et al. |
| 2011/0254916 | A1 | 10/2011 | Fan et al. |
| 2011/0304784 | A1 | 12/2011 | Hirota et al. |
| 2012/0008067 | A1 | 1/2012 | Mun et al. |
| 2012/0013962 | A1 | 1/2012 | Subbaraman et al. |
| 2012/0075698 | A1 | 3/2012 | Minami |
| 2012/0113678 | A1 | 5/2012 | Cornelissen et al. |
| 2012/0120213 | A1 | 5/2012 | Ohyama et al. |
| 2012/0120677 | A1 | 5/2012 | Miyairi et al. |
| 2012/0127547 | A1 | 5/2012 | Gocho et al. |
| 2012/0127573 | A1 | 5/2012 | Robinson et al. |
| 2012/0127751 | A1 | 5/2012 | Kimmel |
| 2012/0176665 | A1 | 7/2012 | Song et al. |
| 2012/0249934 | A1 | 10/2012 | Li et al. |
| 2012/0250141 | A1 | 10/2012 | Chen |
| 2013/0057539 | A1 | 3/2013 | Kim |
| 2013/0082980 | A1 | 4/2013 | Gruhlke et al. |
| 2013/0201723 | A1 | 8/2013 | Gourlay |
| 2014/0210775 | A1* | 7/2014 | Ota .................. G06F 3/0412 345/174 |
| 2014/0375707 | A1* | 12/2014 | Wu .................. G02B 27/2228 345/697 |
| 2015/0355403 | A1 | 12/2015 | Santori et al. |
| 2016/0018582 | A1 | 1/2016 | Fiorentino et al. |
| 2017/0090096 | A1 | 3/2017 | Fattal |
| 2017/0363794 | A1* | 12/2017 | Wan .................. H04N 13/32 |

FOREIGN PATENT DOCUMENTS

| | | |
|---|---|---|
| CN | 101750664 A | 6/2010 |
| CN | 202126538 | 1/2012 |
| JP | H08190095 A | 7/1996 |
| JP | 2000267041 A | 9/2000 |
| JP | 2002031788 A | 1/2002 |
| JP | 2004077897 A | 3/2004 |
| JP | 2004302186 A | 10/2004 |
| JP | 2008083532 A | 4/2008 |
| JP | 2008164963 A | 7/2008 |
| JP | 2009053499 A | 3/2009 |
| JP | 2009288718 A | 12/2009 |
| JP | 2010102188 A | 5/2010 |
| JP | 2010164976 A | 7/2010 |
| JP | 2010237416 A | 10/2010 |
| JP | 2011029161 A | 2/2011 |
| JP | 2011133677 A | 7/2011 |
| JP | 2011232717 A | 11/2011 |
| JP | 2012022085 A | 2/2012 |
| JP | 2012054043 A | 3/2012 |
| WO | 9908257 A1 | 2/1999 |
| WO | 2012069071 A1 | 5/2012 |
| WO | 2014142851 A | 9/2014 |

OTHER PUBLICATIONS

Chen, Yi-Fu, et al., "Mixed Color Sequential Technique for Reducing Color Breakup and Motion Blur Effects," Journal of Display Technology, 2007, pp. 377-385 (8 pages), vol. 3, Issue 4.

Cheng, Hui-Chuan, et al., "Color Breakup Suppression in Field-Sequential Five-Primary-Color LCDs," Journal of Display Technology, Jun. 2010, pp. 229-234, vol. 6, No. 6.

(56) References Cited

OTHER PUBLICATIONS

Ge, Zhibing and Wu, Shin-Tson, "Color Sequential Mobile LCDs," Transflective Liquid Crystal Displays, 2010, pp. 189-211, John Wiley & Sons, Ltd., ISBN: 978-0-470-74373-7.

Sekiya, Kazuo, "68.1: Invited Paper: Design Scheme of LED Scanning Backlights for Field Sequential Color LCDs," SID 09 Digest, 2009, pp. 1026-1029 (ISSN/009-0966X/09/3902-1026).

International Search Report (ISR), 3 pages, from KIPO (ISA/KR), dated Apr. 22, 2016 for counterpart parent PCT patent application No. PCTUS2015030051.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Fattal, David et al., "A multi-directional backlight for a wide-angle, glasses-free three-dimensional display," Nature, Mar. 21, 2013, pp. 348-351, vol. 495, Macmillan Publishers Limited, 2013.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Luxeon DCC for LCD Backlighting, Application Brief AB27, dated Jan. 2005, 38 pages.

* cited by examiner

COLOR-SCANNING GRATING-BASED BACKLIGHT AND ELECTRONIC DISPLAY USING SAME

CROSS-REFERENCE TO RELATED APPLICATIONS

This application is a continuation application of and claims the benefit of priority to prior International Application No. PCT/US2015/030051, filed May 9, 2015, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light-emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. Backlights are light sources (often panel light sources) that are placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
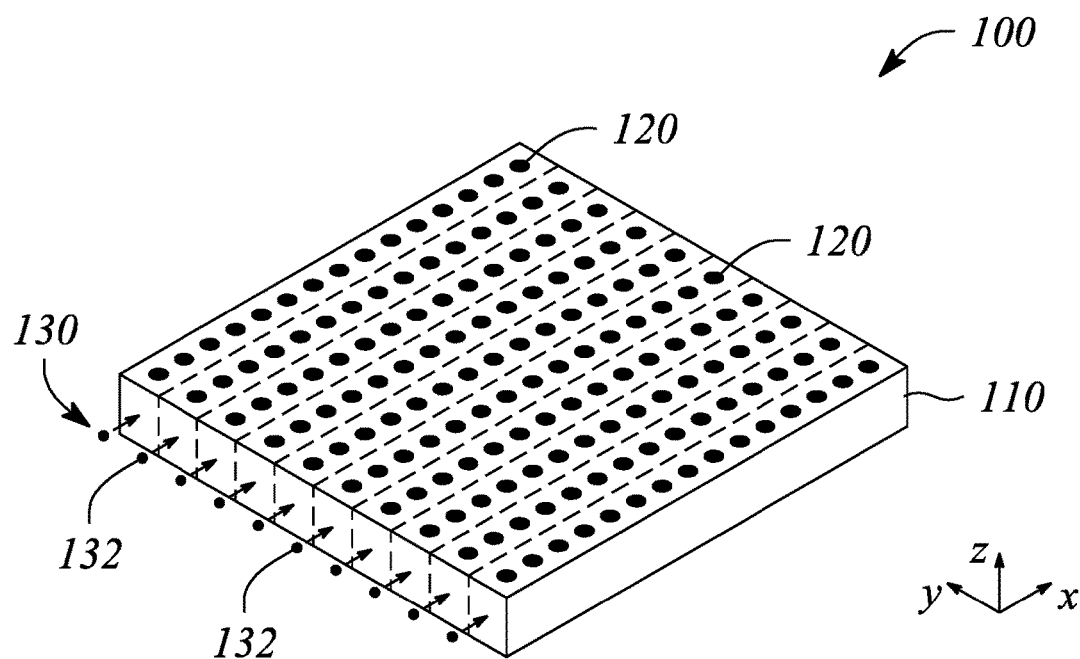
FIG. 1A illustrates a perspective view of a color-scanning grating-based backlight in an example, according to an embodiment consistent with the principles described herein.

Certain examples and embodiments may have other features that are one of in addition to and in lieu of the features illustrated in the above-referenced figures. These and other features are detailed below with reference to the above-referenced figures.

DETAILED DESCRIPTION

Embodiments in accordance with the principles described herein provide color electronic display backlighting employing color scanning. In particular, backlighting of an electronic display described herein employs a light guide having a plurality of diffraction gratings to diffractively scatter or couple light out of the light guide and to direct the coupled-out light in a viewing direction of the electronic display. Further, the backlighting employs color scanning of a multicolor light source to introduce different colors of light into the light guide. Consistent with color scanning, or more particularly according to a color scanning protocol thereof, the introduced light of different colors is configured to propagate in the light guide within different, strips, bands or regions and is to be diffractively scattered or coupled out as the coupled-out light of the respective different colors. Further, according to some embodiments, backlight color scanning is configured to provide a dark region or band between the different colors of light propagating within the light guide. According to other embodiments, a light-confining wall is provided between adjacent regions to confine light within a particular region. According to various embodiments, color scanning may reduce a speed at which a light valve needs to react when modulating light beams produced by the backlighting (the coupled-out light) in a color electronic display application. Moreover, one or both of the dark region and the light-confining wall may reduce, or in some examples may eliminate, bleeding of light colors into adjacent regions of a different color light propagating within the light guide.

According to various embodiments, the coupled-out light produced by the diffraction gratings forms a plurality of light beams that are directed in the viewing direction. Light beams of the plurality may have different principal angular directions from one another, according to various embodiments of the principles described herein. In particular, the plurality of light beams may form or provide a light field in the viewing direction. Further, a light beam of the light beam plurality having a different principal angular direction from other light beams of the plurality may be a different color at different times, e.g., according to a predetermined color scanning protocol. In particular, each light beam in each principle angular direction (of the light beam plurality) may be a different color at different times according to the color scanning protocol, in some embodiments.

According to various embodiments, the different colors of the light beams may represent a plurality of primary colors. Further, in some embodiments, the light beams having the different principal angular directions (also referred to as 'the differently directed light beams') and having different colors at different times may be employed to display information including three-dimensional (3D) information. For example, the differently directed, different color light beams may be modulated and serve as color pixels of a 'glasses free' 3D electronic display, as is described in more detail below.

Herein, a 'scanning protocol' is defined as a procedure for scanning an illumination of a light guide using a light source as a function of time. For example, a scanning protocol may define or describe a procedure for switching on and off portions, elements or individual optical emitters of the light source as a function of time. By extension, a 'color' scanning protocol is defined herein as a procedure that dictates how different colors of light from a multicolor light source are scanned (e.g., switched on and off) to illuminate the light guide with the different colors of light. A color scanning protocol that provides scanning of different colors of light in a sequential manner across a plurality of adjacent bands, strips or regions of a light guide is defined as a 'sequential' color scanning protocol, herein.

For example, a light guide may have a series of adjacent regions that are sequentially numbered from one (1) to N, where N is an integer greater than 1. Color scanning according to a predetermined sequential color scanning protocol may dictate the sequential introduction of a first color (e.g., red) into the adjacent regions of the light guide starting from region 1 and proceeding to region N. The first color may be introduced into a respective region (e.g., region 1) by turning on an optical emitter of a multicolor light source that emits the first color and that is associated with (e.g., configured to illuminate) the respective region. After reaching region N, the color scanning protocol may further dictate that the first color be sequentially removed from the regions starting with region 1 and proceeding to region N by sequentially turning off optical emitters associated with the color and the various regions. The sequential color scanning protocol may further dictate introduction of a second color in a sequential manner upon sequential removal of the first color. According to various embodiments, a dark region (i.e., defined herein as a substantially un-illuminated region) is introduced between regions illuminated by different colors according to the sequential color scanning protocol.

Herein, a 'light guide' is defined as a structure that guides light within the structure using total internal reflection. In particular, the light guide may include a core that is substantially transparent at an operational wavelength of the light guide. In various embodiments, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense, according to some embodiments. That is, within any differentially small section of the plate light guide, the top and bottom surfaces are substantially parallel or co-planar. In some embodiments, a plate light guide may be substantially flat (i.e., confined to a plane) and so the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

According to various embodiments described herein, a diffraction grating (e.g., a multibeam diffraction grating) may be employed to scatter or couple light out of a light guide (e.g., a plate light guide) as a light beam. Herein, a 'diffraction grating' is generally defined as a plurality of features (i.e., diffractive features) arranged to provide diffraction of light incident on the diffraction grating. In some embodiments, the plurality of features may be arranged in a periodic or quasi-periodic manner. For example, the diffraction grating may include a plurality of features (e.g., a plurality of grooves in a material surface) arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a surface (i.e., wherein a 'surface' refers to a boundary between two materials). The surface may be a surface of a plate light guide. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. The light beam plurality may represent a light field. For example, the light beam plurality may include eight light beams that have eight different principal angular directions. The eight light beams in combination (i.e., the light beam plurality) may represent the light field, for example. According to various embodiments, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating.

According to various embodiments described herein, the light coupled out of the light guide by the diffraction grating (e.g., a multibeam diffraction grating) represents a pixel of an electronic display. In particular, the light guide having a multibeam diffraction grating to produce the light beams of the plurality having different principal angular directions may be part of a backlight of or used in conjunction with an electronic display such as, but not limited to, a 'glasses free' three-dimensional (3D) electronic display (also referred to as a multiview or 'holographic' electronic display or an autostereoscopic display). As such, the differently directed light beams produced by coupling out guided light from the light guide using the multibeam diffractive grating may be or represent 'pixels' of the 3D electronic display. Moreover, as described above, the differently directed light beams may form a light field.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 1B:
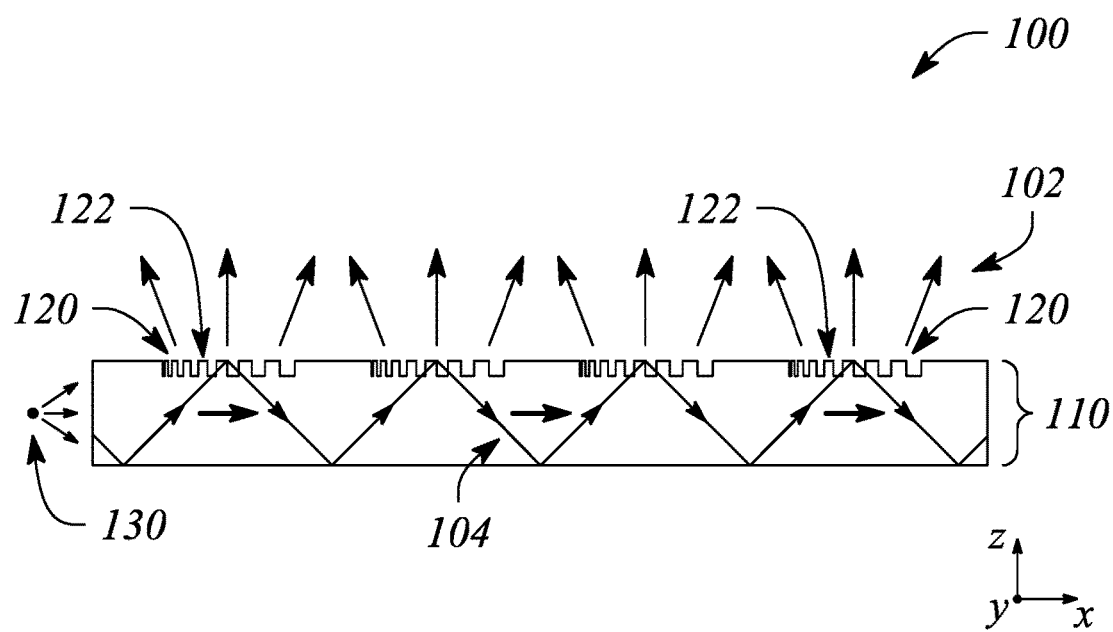
FIG. 1B illustrates a cross sectional view of a color-scanning grating-based backlight in an example, according to an embodiment consistent with the principles described herein.
Figure 1C:
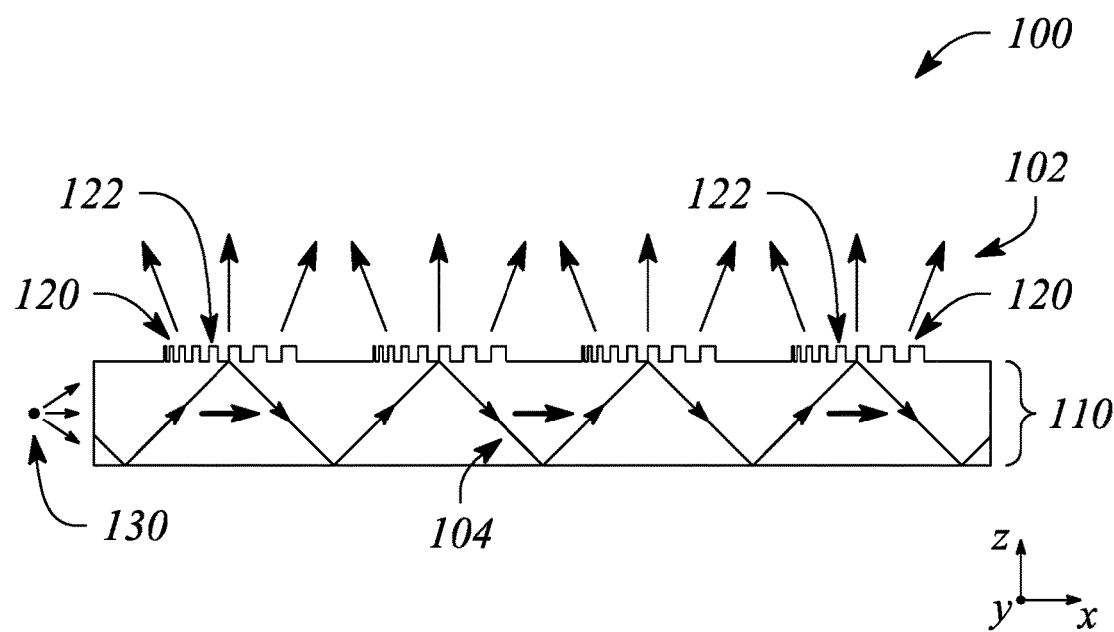
FIG. 1C illustrates a cross sectional view of a color-scanning grating-based backlight in an example, according to another embodiment consistent with the principles described herein.

In accordance with some embodiments of the principles described herein, a color-scanning grating-based backlight is provided. FIG. 1A illustrates a perspective view of a color-scanning grating-based backlight 100 in an example, according to an embodiment consistent with the principles described herein. FIG. 1B illustrates a cross sectional view of a color-scanning grating-based backlight 100 in an example, according to an embodiment consistent with the principles described herein. FIG. 1C illustrates a cross sectional view of a color-scanning grating-based backlight 100 in an example, according to another embodiment consistent with the principles described herein. Color scanning is used to produce a plurality of colors of light emitted by the color-scanning grating-based backlight 100. In particular, the color-scanning grating-based backlight 100 is configured to produce a plurality of light beams 102 of different colors dictated by a color scanning protocol. Individual light beams 102 of the plurality take on different colors according to the color scanning employed by the color-scanning grating-based backlight 100. The plurality of light beams 102 of different colors may form a light field in a viewing direction of an electronic display. Moreover, the different colors of the plurality of light beams 102 may correspond to color information of the electronic display that employs the color-scanning grating-based backlight 100, according to various embodiments.

In particular, a light beam 102 of the plurality of light beams 102 (and within the light field) provided by the color-scanning grating-based backlight 100 may be configured to have a different principal angular direction from other light beams 102 of the plurality, as described above. Further, the light beam 102 may have both a predetermined direction (principal angular direction) and a relatively narrow angular spread within the light field. With respect to use in a three-dimensional (3D) color electronic display, the principal angular direction of the light beam 102 may correspond to an angular direction of a particular view of the 3D color electronic display. As such, the light beam 102 may represent or correspond to a pixel of the 3D color electronic display, according to some embodiments.

In other embodiments (not explicitly illustrated in FIGS. 1A-1C), different color light beams of the plurality may have substantially similar predetermined principal angular directions. The similarly directed different color light beams generally do not form a light field, but instead represent light emitted by the color-scanning grating-based backlight that is substantially unidirectional. The similarly directed light beams may be used to backlight a two-dimensional (2D) color display, for example.

According to various embodiments of the principles herein, color scanning provides the different colors that the light beams 102 of plurality are configured to take on. That is, at different times, a particular light beam 102 may represent different colors of light. Color scanning may change the color of the particular light beam 102 such that the particular light beam 102 is configured to provide or display a variety of colors. Moreover, color scanning may sequentially change colors of the various light beams 102 of the plurality such that all colors of the color-scanning grating-based backlight 100 are represented, according to various embodiments. As such, through color scanning, the plurality of light beams 102 produced by the color-scanning grating-based backlight 100 is configured to take on all of the colors over a predetermined period of time.

In some embodiments, the light beams 102 of the plurality produced by color scanning may be modulated (e.g., by a light valve as described below). The modulation of the light beams 102 directed in different angular directions away from the color-scanning grating-based backlight 100 may be particularly useful for dynamic 3D color electronic display applications, for example. That is, the individually modulated light beam 102 having various different colors directed in a particular view direction may represent a dynamic color pixel of the 3D electronic display corresponding to the particular view direction. Moreover, dynamic 2D color electronic display applications may be supported when the light beams 102 are substantially unidirectional in some embodiments.

As illustrated in FIGS. 1A-1C, the color-scanning grating-based backlight 100 comprises a light guide 110. In particular, the light guide 110 may be a plate light guide 110, according to some embodiments. The light guide 110 is configured to guide light (e.g., from a light source 130 described below) as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example. Herein, the light guide 110 is referred to as a plate light guide 110 for discussion purposes and without loss of generality.

In some embodiments, the light is guided as a beam of light 104. The light beam 104 may be guided along a length of the plate light guide 110, for example. Further, the plate light guide 110 may be configured to guide the light (i.e., the guided light beam 104) at a non-zero propagation angle. The guided light beam 104 may be guided at the non-zero propagation angle within the plate light guide 110 using total internal reflection.

As defined herein, the non-zero propagation angle is an angle relative to a surface (e.g., a top surface or a bottom surface) of the plate light guide 110. In some examples, the non-zero propagation angle of the guided light beam 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees.

In some embodiments, the light to be guided is introduced or coupled into the plate light guide 110 at the non-zero propagation angle (e.g., about 30-35 degrees). One or more of a lens, a mirror or similar reflector (e.g., a tilted collimating reflector), and a prism (not illustrated) may facilitate coupling light into an input end the plate light guide 110 as the beam of light at the non-zero propagation angle. Once coupled into the plate light guide 110, the guided light beam 104 propagates along the plate light guide 110 in a direction that is generally away from the input end (illustrated by bold arrows pointing along an x-axis in FIGS. 1A-1C). Further, the guided light beam 104 propagates by reflecting or 'bouncing' between the top surface and the bottom surface of the plate light guide 110 at the non-zero propagation angle (illustrated by an extended, angled arrow representing a light ray of the guided light beam 104).

The guided light beam 104 produced by coupling light into the plate light guide 110 may be a collimated light beam, according to some examples. In particular, by 'collimated light beam' it is meant that rays of light within the guided light beam 104 are substantially parallel to one another within the guided light beam 104. Rays of light that diverge or are scattered from the collimated light beam of the guided light beam 104 are not considered to be part of the collimated light beam, by definition herein. For example, collimation of the light may be provided by the lens or mirror (e.g., tilted collimating reflector, etc.) used to couple the light into the plate light guide 110 to produce the collimated guided light beam 104.

In some examples, the light guide 110 (e.g., as a plate light guide 110) may be a slab or plate optical waveguide comprising an extended, substantially planar sheet of optically transparent, dielectric material. The substantially planar sheet of dielectric material is configured to guide the guided light beam 104 using total internal reflection. According to various examples, the optically transparent material of the plate light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the plate light guide 110 may further include a cladding layer on at least a portion of a surface (e.g., one or both of the top surface and the bottom surface) of the plate light guide 110 (not illustrated). The cladding layer may be used to further facilitate total internal reflection, according to some examples.

According to various embodiments, the color-scanning grating-based backlight 100 further comprises a diffraction grating 120. In particular, the color-scanning grating-based backlight 100 may comprise a plurality of diffraction gratings 120. The plurality of diffraction gratings 120 may be arranged as or represent an array of diffraction gratings 120, for example. As illustrated in FIGS. 1A-1C, the diffraction gratings 120 are located at a surface of the plate light guide 110 (e.g., a top or front surface). In other examples (not illustrated), one or more of the diffraction gratings 120 may be located within the plate light guide 110. In yet other embodiments (not illustrated), one or more of the diffraction gratings 120 may be located at or on a bottom or back surface of the plate light guide 110.

The diffraction grating 120 is configured to scatter or couple out a portion of the guided light beam 104 from the plate light guide 110 by or using diffractive coupling (also referred to as 'diffractive scattering'), according to various embodiments. The portion of the guided light beam 104 may be diffractively coupled out by the diffraction grating 120 through the light guide surface (e.g., through the top surface of the plate light guide 110). Further, the diffraction grating 120 is configured to diffractively couple out the portion of the guided light beam 104 as a coupled-out light beam (illustrated in FIGS. 1B-1C as light beam 102). The coupled-out light beam 102 is directed away from the light guide surface at a predetermined principal angular direction, according to various examples. In particular, the coupled-out portion of the guided light beam 104 is diffractively redirected away from the light guide surface by the plurality of diffraction gratings 120 as a plurality of light beams 102. As discussed above, each of the light beams 102 of the light beam plurality may have a different principal angular direction and the light beam plurality may represent a light field, according to some examples. According to other embodiments, each of the light beams 102 of the light beam plurality may have substantially the same principal angular direction and the light beam plurality may represent substantially unidirectional light as opposed to the light field represented by the light beam plurality having light beams with different principal angular directions.

According to various embodiments, the diffraction grating 120 comprises a plurality of diffractive features 122 that diffract light (i.e., provide diffraction). The diffraction is responsible for the diffractive coupling of the portion of the guided light beam 104 out of the plate light guide 110. For example, the diffraction grating 120 may include one or both of grooves in a surface of the plate light guide 110 and ridges protruding from the light guide surface 110 that serve as the diffractive features 122. The grooves and ridges may be arranged parallel or substantially parallel to one another and, at least at some point, perpendicular to a propagation direction of the guided light beam 104 that is to be coupled out by the diffraction grating 120.

In some examples, the diffractive features may be etched, milled or molded into the surface or applied on the surface. As such, a material of the diffraction grating 120 may include a material of the plate light guide 110. As illustrated in FIG. 1B, for example, the diffraction gratings 120 comprise substantially parallel grooves formed in the surface of the plate light guide 110. In FIG. 1C, the diffraction gratings 120 comprise substantially parallel ridges that protrude from the light guide surface, for example. In other examples (not illustrated), the diffraction gratings 120 may be implemented in or as a film or layer applied or affixed to the light guide surface.

The diffraction gratings 120 of the plurality of diffraction gratings 120 may be arranged in a variety of configurations that are one or more of at, on and in the surface of the plate light guide 110. For example, the plurality of diffraction gratings 120 may be arranged in columns and rows across the light guide surface (e.g., as an array). In another example, a plurality of diffraction gratings 120 may be arranged in groups and the groups may be arranged in rows and columns. In yet another example, the plurality of diffraction gratings 120 may be distributed substantially randomly across the surface of the plate light guide 110.

According to some embodiments, the plurality of diffraction gratings 120 comprises a multibeam diffraction grating 120. For example, all or substantially all of the diffraction gratings 120 of the plurality may be multibeam diffraction gratings 120 (i.e., a plurality of multibeam diffraction gratings 120). The multibeam diffraction grating 120 is a diffraction grating 120 that is configured to couple out the portion of the guided light beam 104 as a plurality of light beams 102 (e.g., as illustrated in FIGS. 1B and 1C), wherein a light beam 102 of the plurality has a different principal angular direction from other light beams 102 of the light beam plurality. Together, the plurality of light beams 102 coupled out by the multibeam diffraction grating 120 form a light field, according to various embodiments.

According to various examples, the multibeam diffraction grating 120 may comprise a chirped diffraction grating 120 (i.e., a chirped multibeam diffraction grating). By definition, the 'chirped' diffraction grating 120 is a diffraction grating exhibiting or having a diffraction spacing of the diffractive features that varies across an extent or length of the chirped diffraction grating 120. Herein, the varying diffraction spacing is defined as a 'chirp'. As a result, the guided light beam 104 that is diffractively coupled out of the plate light guide 110 exits or is emitted from the chirped diffraction grating 120 as the light beams 102 at different diffraction angles corresponding to different points of origin across the chirped diffraction grating 120. By virtue of a predefined chirp, the chirped diffraction grating 120 is responsible for the predetermined and different principal angular directions of the coupled-out light beams 102 of the light beam plurality.

Figure 2A:
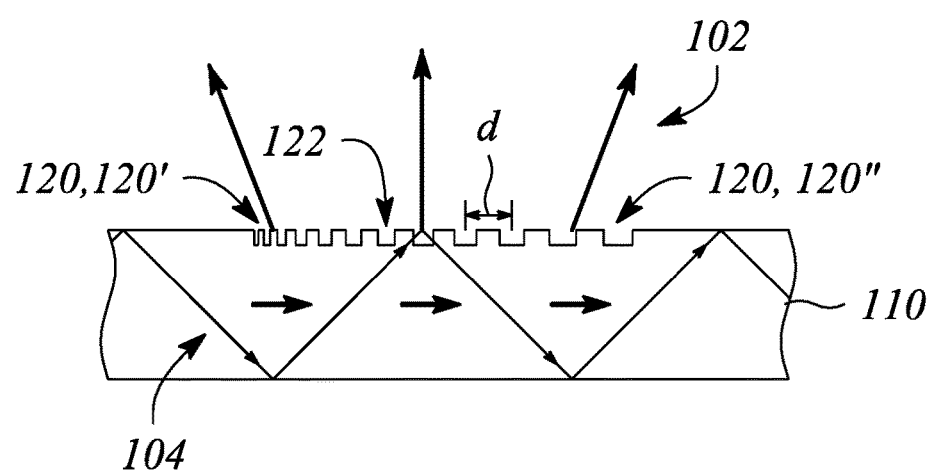
FIG. 2A illustrates a cross sectional view of a portion of a color-scanning grating-based backlight including a multibeam diffraction grating in an example, according to an embodiment consistent with the principles described herein.
Figure 2B:
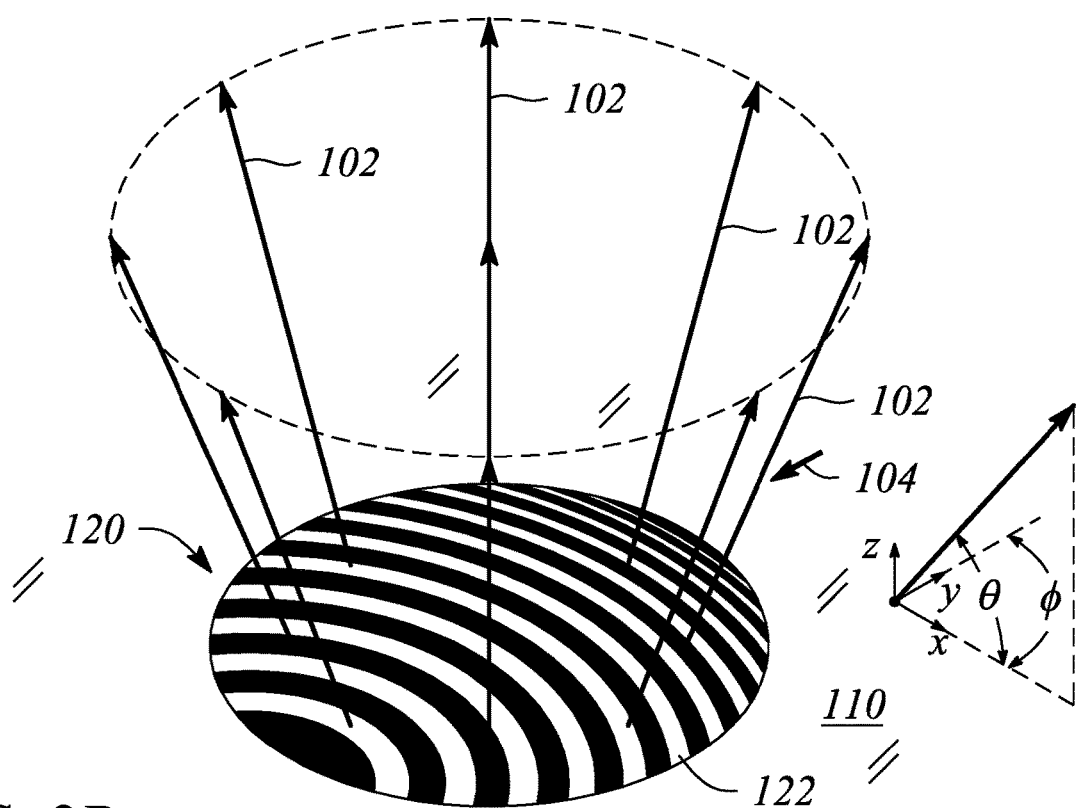
FIG. 2B illustrates a perspective view of the color-scanning grating-based backlight of FIG. 2A including the multibeam diffraction grating in an example, according to an embodiment consistent with the principles described herein.

FIG. 2A illustrates a cross sectional view of a portion of a color-scanning grating-based backlight 100 including a multibeam diffraction grating 120 in an example, according to an embodiment consistent with the principles described herein. FIG. 2B illustrates a perspective view of the color-scanning grating-based backlight 100 of FIG. 2A including the multibeam diffraction grating 120 in an example, according to an embodiment consistent with the principles described herein. The multibeam diffraction grating 120 illustrated in FIG. 2A comprises grooves in a surface of the plate light guide 110, by way of example and not limitation. For example, the multibeam diffraction grating 120 illustrated in FIG. 2A may represent one of the groove-based diffraction gratings 120 illustrated in FIG. 1B.

As illustrated in FIGS. 2A-2B (and also FIGS. 1B-1C by way of example not limitation), the multibeam diffraction grating 120 is a chirped diffraction grating. In particular, as illustrated, the diffractive features 122 are closer together at a first end 120' of the multibeam diffraction grating 120 than at a second end 120". Further, the diffractive spacing d of the illustrated diffractive features 122 varies from the first end 120' to the second end 120". In some examples, the chirped diffraction grating 120 may have or exhibit a chirp of the diffractive spacing d that varies linearly with distance. As such, the chirped diffraction grating 120 may be referred to as a 'linearly chirped' diffraction grating.

In some examples, the light beams 102 produced by coupling light out of the plate light guide 110 using the multibeam diffraction grating 120 may diverge (i.e., be diverging light beams 102) when the guided light beam 104 propagates in the plate light guide 110 in a direction from the first end 120' of the multibeam diffraction grating 120 to the second end 120" of the multibeam diffraction grating 120 (e.g., as illustrated in FIG. 2A). Alternatively, converging light beams 102 may be produced when the guided light beam 104 propagates in the reverse direction in the plate light guide 110, i.e., from the second end 120" to the first end 120' of the multibeam diffraction grating 120, according to other examples (not illustrated).

In another example (not illustrated), the chirped diffraction grating 120 may exhibit a non-linear chirp of the diffractive spacing d. Various non-linear chirps that may be used to realize the chirped diffraction grating 120 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be used.

As illustrated in FIG. 2B, the multibeam diffraction grating 120 includes diffractive features 122 (e.g., grooves or ridges) one or more of in, at and on a surface of the plate light guide 110 that are both chirped and curved (i.e., the multibeam diffraction grating 120 is a curved, chirped diffraction grating). The guided light beam 104 has an incident direction relative to the multibeam diffraction grating 120 and the plate light guide 110, as illustrated by a bold arrow labeled 104 in FIG. 2B. Also illustrated is the plurality of coupled-out or emitted light beams 102 pointing away from the multibeam diffraction grating 120 at the surface of the plate light guide 110. The illustrated light beams 102 are emitted in a plurality of predetermined different principal angular directions. In particular, the predetermined different principal angular directions of the emitted light beams 102 are different in both azimuth and elevation (i.e., to form the light field), as illustrated. According to various examples, both the predefined chirp of the diffractive features 122 and the curve of the diffractive features 122 may be responsible for the predetermined different principle angular directions of the emitted light beams 102.

For example, due to the curve, the diffractive features 122 within the multibeam diffraction grating 120 may have varying orientations relative to an incident direction of the guided light beam 104. In particular, an orientation of the diffractive features 122 at a first point or location within the multibeam diffraction grating 120 may differ from an orientation of the diffractive features 122 at another point or location relative to the guided light beam incident direction. With respect to the coupled-out or emitted light beam 102, an azimuthal component $\phi$ of the principal angular direction $\{\theta, \phi\}$ of the light beam 102 may be determined by or correspond to the azimuthal orientation angle $\theta_f$ of the diffractive features 122 at a point of origin of the light beam 102 (i.e., at a point where the incident guided light 104 is coupled out), according to some examples. As such, the varying orientations of the diffractive features 122 within the multibeam diffraction grating 120 produce different light beams 102 having different principle angular directions $\{\theta, \phi\}$, at least in terms of their respective azimuthal components $\phi$.

In particular, at different points along the curve of the diffractive features 122, an 'underlying diffraction grating' of the multibeam diffraction grating 120 associated with the curved diffractive features 122 has different azimuthal orientation angles $\phi_f$. Thus, at a given point along the curved diffractive features 122, the curve has a particular azimuthal orientation angle $\phi_f$ that generally differs from the azimuthal orientation angle $\phi_f$ at another point along the curved diffractive features 122. Further, the particular azimuthal orientation angle $\phi_f$ results in a corresponding azimuthal component $\phi$ of a principal angular direction $\{\theta, \phi\}$ of a light beam 102 emitted from the given point. In some examples, the curve of the diffractive features (e.g., grooves, ridges, etc.) may represent a section of a circle. The circle may be coplanar with the light guide surface. In other examples, the curve may represent a section of an ellipse or another curved shape, e.g., that is coplanar with the light guide surface.

In other examples, the multibeam diffraction grating 120 may include diffractive features 122 that are 'piecewise' curved. In particular, while the diffractive feature 122 may not describe a substantially smooth or continuous curve per se, at different points along the diffractive feature 122 within the multibeam diffraction grating 120, the diffractive feature 122 still may be oriented at different angles with respect to the incident direction of the guided light beam 104. For example, the diffractive feature 122 may be a groove including a plurality of substantially straight segments, each segment having a different orientation than an adjacent segment. Together, the different angles of the segments may approximate a curve (e.g., a segment of a circle), according to various embodiments. In yet other examples, the diffractive features 122 may merely have different orientations relative to the incident direction of the guided light at different locations within the multibeam diffraction grating 120 without approximating a particular curve (e.g., a circle or an ellipse).

Referring again to FIGS. 1A-1C, the color-scanning grating-based backlight 100 further comprises a light source 130 (i.e., as a source of the guided light beam 104), according to various embodiments. In particular, the color-scanning grating-based backlight 100 further comprises a multicolor light source 130. The multicolor light source 130 is configured to provide light to the plate light guide 110 as the guided light 104, i.e., as the guided light beam 104. That is, the light provided by the multicolor light source 130, when coupled into the plate light guide 110, is the guided light beam 104, according to various embodiments.

Further, the multicolor light source 130 is configured to provide light as the guided light beam 104 according to a color scanning protocol. In particular, according to the color scanning protocol, provided light of a first color in a first region of the plate light guide 110 is separated from provided light of a second color in a second region of the plate light guide 110 by an intervening dark region of the plate light guide 110, by definition herein. Further, by definition, the intervening 'dark' region of the plate light guide 110 is defined as a plate light guide region into which the multicolor light source 130 provides little or substantially no light. That is, the dark region is a region of the plate light guide 110 that is substantially un-illuminated or at least is not intentionally illuminated by the multicolor light source 130 at a particular instance in time (i.e., although due to scanning of the color scanning protocol, the dark region may not remain dark at another instance in time). For example, an optical emitter of the multicolor light source 130 corresponding to a particular plate light guide region may be switched off to create the dark region. Further, the dark region is an 'intervening' dark region since, by definition, the dark region is between plate light guide regions illuminated by the first and second colors, respectively.

In various embodiments, the multicolor light source 130 may comprise substantially any source of color light including, but not limited to, a plurality of light-emitting diodes (LEDs) and a laser. In some embodiments, the multicolor light source 130 may produce a substantially monochromatic light having a narrowband spectrum denoted by a particular color. In particular, the particular color may be or represent a primary color. For example, the multicolor light source 130 may produce a plurality of different colors of light representing a plurality of primary colors. The primary colors may comprise red light, green light and blue light, for example. Further, the primary colors may be primary colors of selected according to a color model such as, but not limited to, a red-green-blue (RGB) color model configured to support a color gamut of a color electronic display.

Thus, according to some embodiments, the multicolor light source 130 may comprise a plurality of color optical emitters 132, for example, LEDs. LEDs of the color optical emitter plurality may represent different colors of the primary colors of the color electronic display, for example. In particular, the LEDs may comprise a red LED to produce red light, a green LED to produce green light, and a blue LED to produce blue light of the RGB color model, for example. The multicolor light source 130 comprising a linear array of the optical emitters 132 arranged along an edge of the plate light guide 110 is illustrated in FIG. 1A. Each of the illustrated optical emitters 132 may comprise a red LED, a green LED and blue LED, for example. Also illustrated with dashed lines on the plate light guide 110, by way of example and not limitation, is a plurality of adjacent, regions (i.e., illustrated as elongated, rectangular bands or strips) that substantially align with the linear array of optical emitters 132. The respective regions of the plate light guide 110 are configured to be illuminated by corresponding optical emitters 132 aligned with the respective regions, for example to provide each respective region with each of the red light, the green light and the blue light of the RGB color model.

According to some embodiments, the color scanning protocol of the multicolor light source 130 may comprises selectively scanning through different colors of the optical emitters 132 of the multicolor light source 130 to illuminate the different regions across the plate light guide from a first region to a last region in a sequential manner with intervening dark regions provided between different colors. In another example, the color scanning protocol may scan through the different colors of the optical emitters 132 and illuminate the different regions in a non-sequential (e.g., random) manner as a function of time. Further, as illustrated in FIG. 1A, the regions of the plate light guide 110 that include the first region, the second region and the intervening region may comprise one or more substantially parallel bands or strips across the plate light guide extending away from the multicolor light source. The multicolor light source 130 may be located at and coupled to an edge of the plate light guide 110 corresponding to an input end of the substantially parallel bands or strips that form the various regions, for example.

Figure 3A:
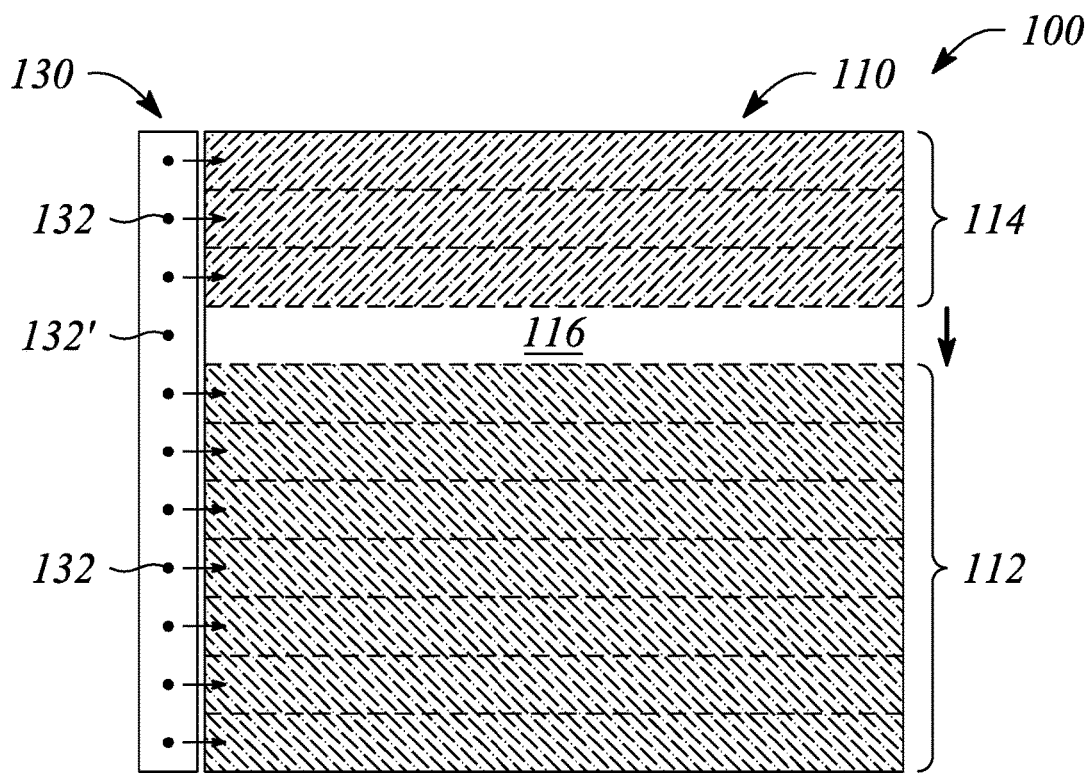
FIG. 3A illustrates a plan view of a color-scanning grating-based backlight in an example, according to an embodiment consistent with the principles described herein.
Figure 3B:
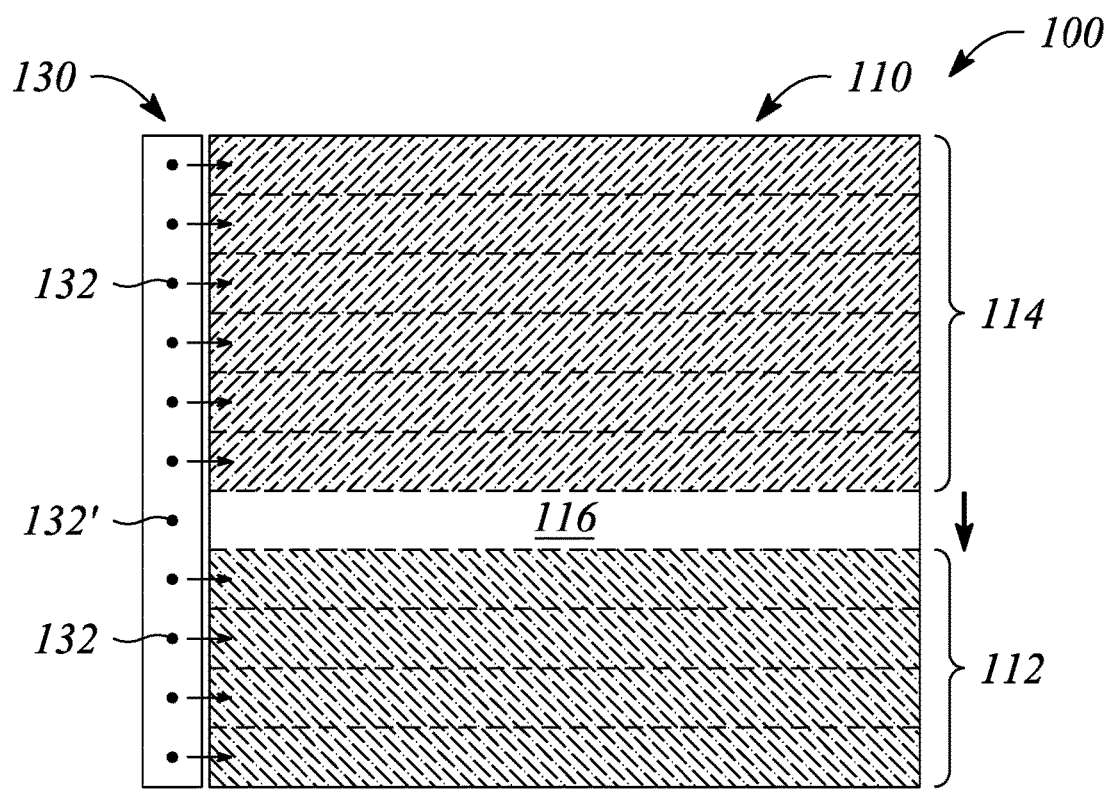
FIG. 3B illustrates a plan view of the color-scanning grating-based backlight of FIG. 3A in an example, according to an embodiment consistent with the principles described herein.
Figure 3C:
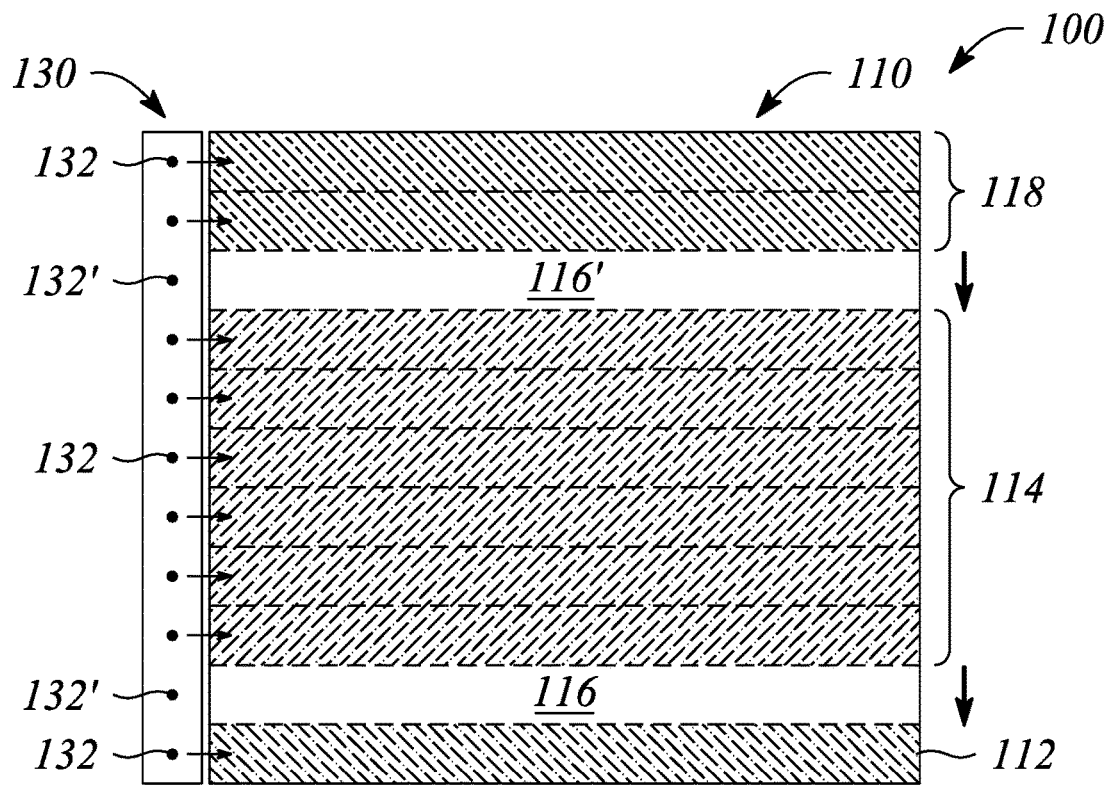
FIG. 3C illustrates a plan view of a color-scanning grating-based backlight of FIG. 3B in an example, according to an embodiment consistent with the principles described herein.
Figure 3D:
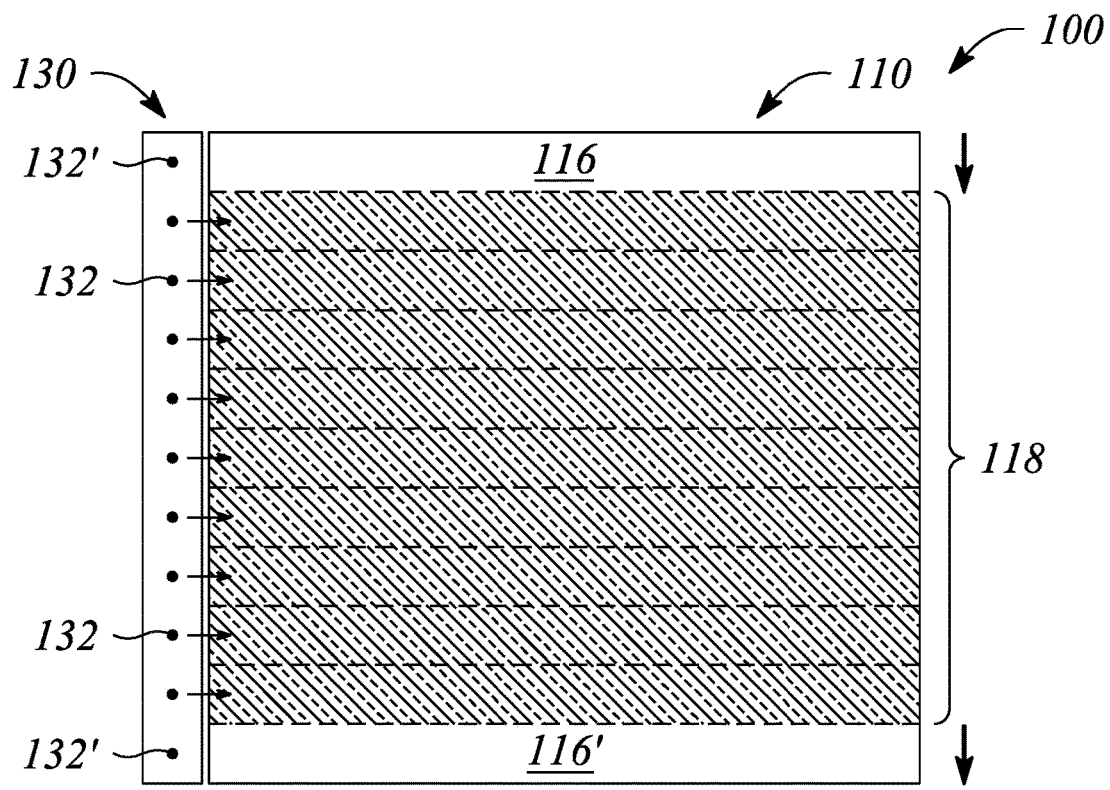
FIG. 3D illustrates a plan view of a color-scanning grating-based backlight of FIG. 3C in an example, according to an embodiment consistent with the principles described herein.

FIG. 3A illustrates a plan view of a color-scanning grating-based backlight 100 in an example, according to an embodiment consistent with the principles described herein. FIG. 3B illustrates a plan view of the color-scanning grating-based backlight 100 of FIG. 3A in another example, according to an embodiment consistent with the principles described herein. FIG. 3C illustrates a plan view of a color-scanning grating-based backlight 100 of FIG. 3B in another example, according to an embodiment consistent with the principles described herein. FIG. 3D illustrates a plan view of a color-scanning grating-based backlight 100 of FIG. 3C in another example, according to an embodiment consistent with the principles described herein. In particular, the plan views illustrated in FIG. 3A-3D represent a time sequence of a color scanning protocol example employed with the multicolor light source 130, as described below.

The color-scanning grating-based backlight 100 illustrated in FIGS. 3A-3D comprises the plate light guide 110 and the multicolor light source 130. The plate light guide 110 includes an array of diffraction gratings, not illustrated for simplicity of discussion only. The multicolor light source 130 comprises a plurality of optical emitters 132 and a corresponding plurality of regions of the plate light guide 110 illustrated as substantially parallel bands or strips delineated by dashed lines in FIGS. 3A-3D. As illustrated, each optical emitter 132 is configured to illuminate or provide light to a different one of the substantially parallel bands or strips that represent the plate light guide regions.

In FIG. 3A, a first region 112 of the plate light guide 110 is illuminated with a first color of light (e.g., red) by the multicolor light source 130 and is illustrated using a first crosshatch pattern on a plurality of adjacent bands, by way of example and not limitation. Dashed lines delineate the parallel bands. Further in FIG. 3A, a second region 114 of the plate light guide 110 is illuminated with a second color of light (e.g., green) by the multicolor light source 130, and is illustrated using a second crosshatch pattern on another plurality of adjacent bands, by way of example and not limitation. Arrows extending from the optical emitters 132 in FIG. 3A depict light from the multicolor light source 130 being coupled into the plate light guide 110 as the guided light that illuminates the regions 112, 114, for example. As illustrated, the first region 112 and the second region 114 each include different subsets of the substantially parallel bands. Further, corresponding subsets of the multicolor light source optical emitters 132 are used to respectively illuminate the first region 112 and the second region 114, as illustrated.

FIG. 3A further illustrates a region 116 between the first region 112 and the second region 114, which represents an intervening dark region 116 that is illustrated with no crosshatching. The intervening dark region 116 may be provided by turning off an optical emitter 132' of the multicolor light source 130 corresponding to a parallel band or bands between the respective parallel bands of the first and second regions 112, 114. The color-scanning grating-based backlight 100 illustrated in FIG. 3A corresponds to a first time period of the color scanning protocol, for example. As illustrated, the color scanning protocol may sequentially scan through the different optical emitter colors of the multicolor light source 130 in a direction of scanning illustrated by a bold arrow pointing in the scanning direction from the region 114 to the region 112 in FIG. 3A.

FIG. 3B illustrates a second time period of the color scanning protocol according to the scanning direction illustrated by the bold arrow therein. In particular, as illustrated in FIG. 3B, scanning according to the color scanning protocol has progressed and the first and second regions 112, 114 along with the intervening dark region 116 have moved further along a width of the plate light guide 110 (e.g., as indicated by the bold arrow between the first and second regions 112, 114). The scanning comprises one or more of changing the color emitted by optical emitters 132, turning on optical emitters 132 that were previously turned off and turning off optical emitters 132 that were previously turned on. The scanning progression corresponds to the first and second regions 112, 114 changing in size (either increasing or decreasing the number of adjacent parallel bands of each), which also corresponds to a new location of the intervening dark region 116. By way of example herein, FIGS. 3A and 3B illustrate that the first color region 112 decreased in size from seven adjacent parallel bands to four adjacent parallel bands and the second color region 114 increased in size from three adjacent parallel bands to six adjacent parallel bands in the scanning direction.

In FIG. 3C, a third color (e.g., blue) is introduced in the color scanning protocol, as illustrated with a third region 118 of illumination adjacent to but spaced apart from the second region 114 by another intervening dark region 116'. FIG. 3C may represent a third time period in the scan of the color scanning protocol, for example. Note that when viewed as a function of time, the color scanning protocol illustrated in FIGS. 3A-3D appears to 'sweep' the intervening dark regions 116, 116' across the plate light guide 110 with different colors corresponding to the first, second and third regions 112, 114, 116 sweeping across the plate light guide 110, as well. By way of example herein, FIG. 3C illustrates that the first color region 112 decreased in size from four adjacent parallel bands in FIG. 3B to one parallel band with the introduction of the third color region 118 and the other intervening dark region 116', while the second color region 114 remaining the same size from FIGS. 3B to 3C, all with respect to the scanning direction.

In some embodiments, a color scanning protocol may be provided in which each of the different colors individually substantially fills all of the plate light guide 110, for at least an instant in time (e.g., a selected time period). An example of a time period according to such a color scanning protocol is illustrated in FIG. 3D in which an individual color of light fills or substantially fills the regions of the plate light guide 110 during a scan. In particular, in FIG. 3D, the scan has progressed in the direction indicated by the bold arrow across the plate light guide 110 to a point in time where substantially the entire plate light guide 110 is illuminated as the third region 118 (e.g., with blue color light), albeit with dark regions 116, 116' bounding the third region 118, as illustrated by way of example and not limitation. Any of the colors of the color scanning protocol may fill or substantially fill the plate light guide 110 as illustrated in FIG. 3D, for example.

In some embodiments, the plate light guide 110 may comprise a structure configured to confine or substantially confine light from the light source 130 within a particular strip or region of the plate light guide 110. The structure may comprise a 'wall' between adjacent bands, strips or regions of the plate light guide 110 that blocks or at least substantially blocks transmission light between respective ones of the adjacent, bands, strips or regions. In other words, the wall may prevent light (e.g., by reflection, absorption, etc.) from passing from one strip or region to another, according to these embodiments. As such, the wall is a 'light-confining' wall, by definition herein. According to various embodiments, one or both of the intervening dark region 116 and the light-confining wall of the plate light guide 110 may be configured to separate the provided first color light in the first region from provided second color light in the second region from one another.

Figure 4A:
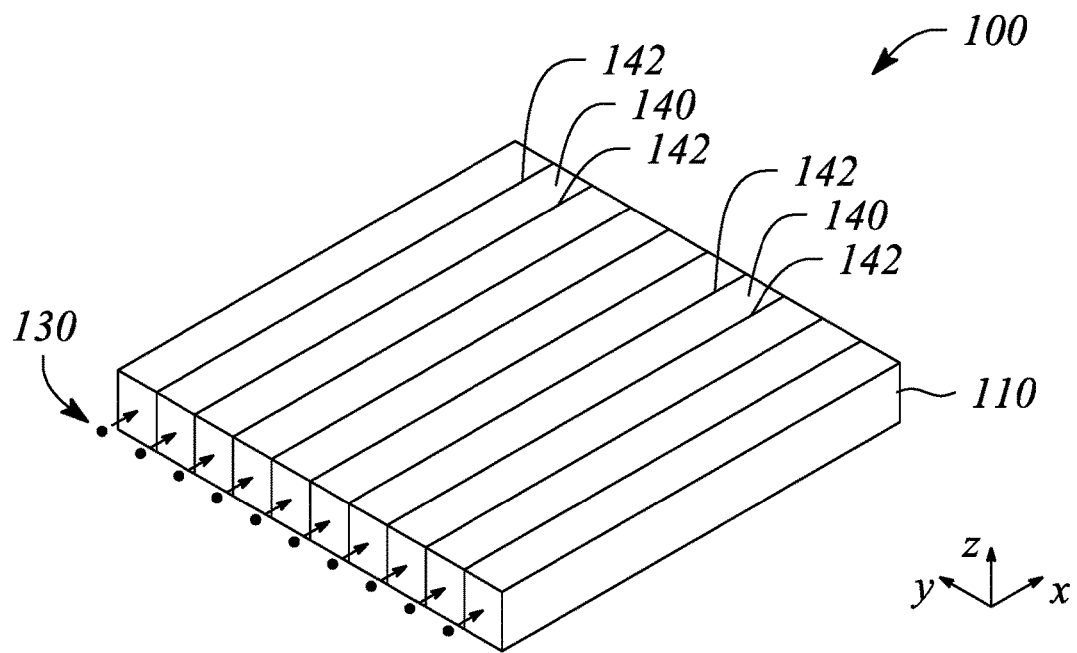
FIG. 4A illustrates a perspective view of a color-scanning grating-based backlight having light-confining walls in an example, according to an embodiment consistent with the principles described herein.
Figure 4B:
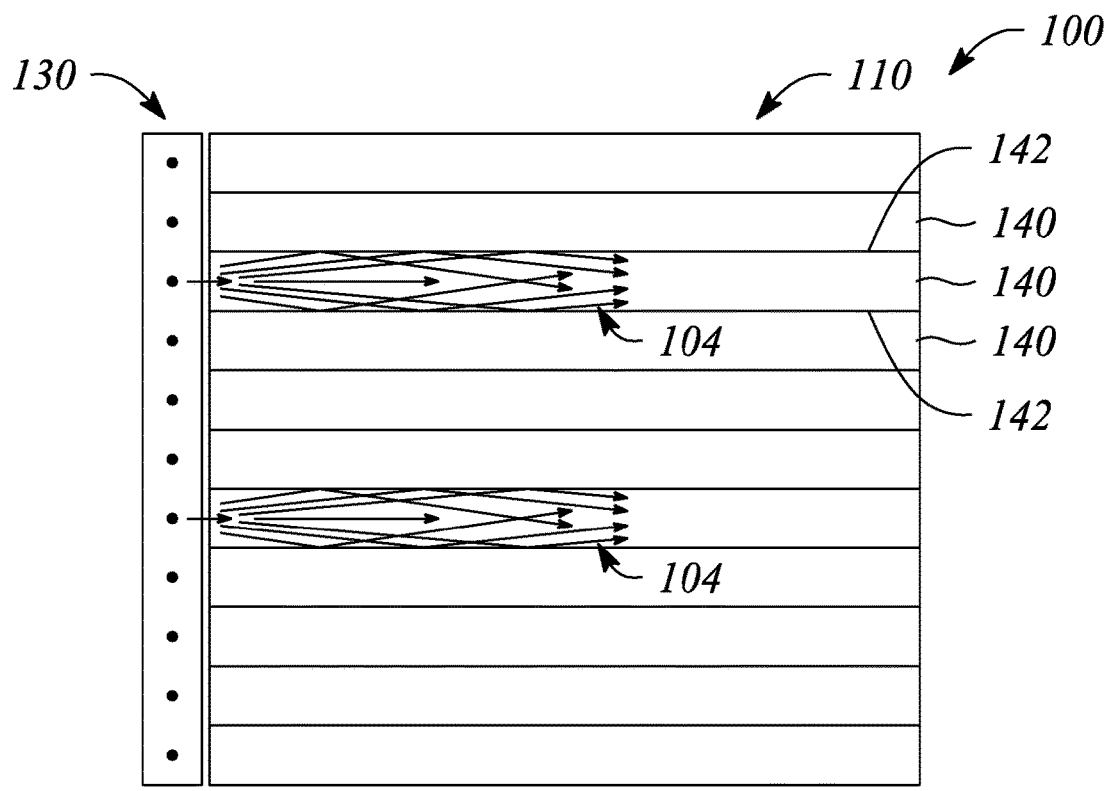
FIG. 4B illustrates a plan view of the color-scanning grating-based backlight having light-confining walls illustrated in FIG. 4A in an example, according to an embodiment consistent with the principles described herein.

FIG. 4A illustrates a perspective view of a color-scanning grating-based backlight 100 having light-confining walls in an example, according to an embodiment consistent with the principles described herein. FIG. 4B illustrates a plan view of the color-scanning grating-based backlight 100 having light-confining walls illustrated in FIG. 4A in an example, according to an embodiment consistent with the principles described herein. In particular, the color-scanning grating-based backlight 100 illustrated in FIGS. 4A and 4B includes a plurality of adjacent bands or strips 140. Further, the adjacent bands or strips 140 are separated by light-confining walls 142, as illustrated. By way of example and not limitation, the light-confining walls 142 illustrated in FIGS. 4A and 4B are configured to confine light be reflection, i.e., the light-confining walls 142 are 'reflective' walls, as illustrated. Guided light beams 104 depicted in FIG. 4A 'bounce' or reflect off of the light-confining walls 142 and remain within or are confined to respective ones of the adjacent bands or strips 140 as the guided light beams 104 propagate away from light sources 130 (e.g., multicolor light sources 130).

In some examples, the light-confining wall 142 may be a total internal reflection (TIR) wall. A gap (e.g., an air-filled gap) or a layer of material included in the plate light guide 110 and having a lower reflective index than a refractive index of plate light guide 110 may be used to form a TIR wall, for example. In another example, a reflective wall (e.g., a mirror or mirror layer) may be provided by inclusion of a reflective material between adjacent bands or strips 140 of the plate light guide 110. The reflective material may include, but is not limited to a reflective metal layer (e.g., silver, aluminum, gold, etc.) and a Bragg reflector. In yet other examples, an absorptive material may be provided between the adjacent bands or strips 140 of the plate light guide 110 and the light-confining wall 142 may be an absorptive wall. The absorptive material may include a layer of any material (e.g., black paint) that blocks or substantially block transmission of light by absorption.

In some embodiments, the plate light guide 110 may comprise a strip light guide. In particular, the plate light guide 110 may comprise a plurality of substantially parallel strip light guides arranged adjacent to one another to approximate a plate light guide and thus be considered a form of a 'plate' light guide, by definition herein. The adjacent strip light guides of this form of plate light guide may substantially confine light within the respective strip light guides, according to various embodiments. For examples, the adjacent strip light guides may be separated from one another by a gap to form a TIR wall therebetween. In another examples, edges of the strip light guides may be coated by a material to block or substantially block transmission of light from one strip light guide to another. The material may include, but is not limited to, a reflective material or reflective layer (e.g., a Bragg reflector), a light absorbing material (e.g., black paint), or a material having a lower refractive index than a refractive index of a material of the plate light guide 110, itself (e.g., as a cladding to create a TIR wall). The adjacent strips or bands 142 illustrated in FIGS. 4A and 4B above may be strip light guides, for example.

According to some embodiments of the principles described herein, a three-dimensional (3D) color electronic display is provided. In various embodiments, the 3D color electronic display is configured to emit modulated, different color light beams having different directions as pixels of the 3D color electronic display used to display 3D information (e.g., 3D images). In some examples, the 3D color electronic display is an autostereoscopic or glasses-free 3D electronic display. In particular, different ones of the modulated, different color, light beams may correspond to different 'views' associated with the 3D color electronic display, according to various examples. The different views may provide a 'glasses free' (e.g., autostereoscopic or 'holographic') representation of information being displayed by the 3D color electronic display, for example.

Figure 5:
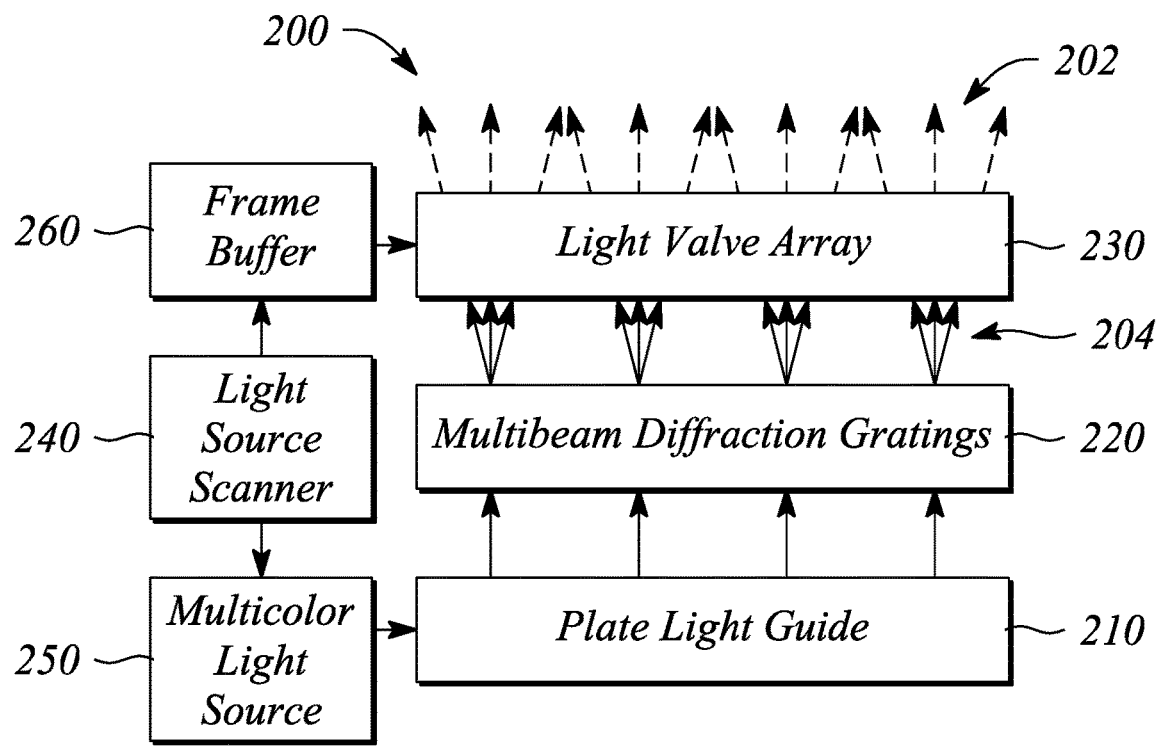
FIG. 5 illustrates a block diagram of a three-dimensional (3D) color electronic display in an example, according to an embodiment consistent with the principles described herein.

FIG. 5 illustrates a block diagram of a three-dimensional (3D) color electronic display 200 in an example, according to an embodiment consistent with the principles described herein. The 3D color electronic display 200 may be used to present 3D information such as, but not limited to 3D images, for example. In particular, the 3D color electronic display 200 illustrated in FIG. 5 is configured to emit modulated light beams 202 of different colors in different principal angular directions representing color pixels corresponding to different views of the 3D color electronic display 200. The modulated, different color light beams 202 are illustrated as diverging (e.g., as opposed to converging) in FIG. 5 by way of example and not limitation.

The 3D color electronic display 200 illustrated in FIG. 5 comprises a plate light guide 210 to guide light. The guided light in the plate light guide 210 is a source of the light that becomes the modulated, different color light beams 202 emitted by the 3D color electronic display 200. According to some embodiments, the plate light guide 210 may be substantially similar to the plate light guide 110 described above with respect to color-scanning grating-based backlight 100. For example, the plate light guide 210 may be a slab optical waveguide that is a planar sheet of dielectric material configured to guide light by total internal reflection. The guided light may be guided at a non-zero propagation angle as a beam of light. In particular, the guided light may include a plurality of different color guided light beams. Further, the guided light beam(s) may be collimated (i.e., the light may be guided as collimated or substantially collimated beams of light), according to some embodiments.

In some embodiments, the plate light guide 210 may comprise light-confining walls configured to confine guided light within a strip of the plate light guide 210 bounded by the light-confining walls. In some embodiments, the light-confining walls may be substantially similar to the light-confining walls 142 of the color-scanning grating-based backlight 100, described above. In particular, the light-confining walls may provide separation of different color guided light beams. Further, the light-confining walls may collimate or further collimate different color guided light beams in a plane of the plate light guide 210, according to some embodiments.

The 3D color electronic display 200 illustrated in FIG. 5 further comprises an array of multibeam diffraction gratings 220. The array of multibeam diffraction gratings 220 may be located adjacent to (e.g., one or more of on, in and at) a surface of the plate light guide 210, for example. According to various embodiments, a multibeam diffraction grating 220 of the array is configured to diffractively couple out a portion of light guided within the plate light guide 210 as a plurality of coupled-out light beams 204 having different principal angular directions representing or corresponding to different views of the 3D color electronic display 200. In some embodiments, the multibeam diffraction gratings 220 may be substantially similar to the multibeam diffraction gratings 120 of the color-scanning grating-based backlight 100, described above.

For example, the array of multibeam diffraction gratings 220 may include a chirped diffraction grating. In some examples, diffractive features (e.g., grooves, ridges, etc.) of the multibeam diffraction gratings 220 are curved diffractive features. For example, the curved diffractive features may include ridges or grooves that are curved (i.e., continuously curved or piece-wise curved) and spacings between the curved diffractive features that vary as a function of distance across the multibeam diffraction gratings 220 of the array. In some examples, the multibeam diffraction gratings 220 may be chirped diffraction gratings having curved diffractive features.

As illustrated in FIG. 5, the 3D color electronic display 200 further comprises a light valve array 230. The light valve array 230 includes a plurality of light valves configured to modulate the coupled-out light beams 204 of the light beam plurality, according to various examples. In particular, the light valves of the light valve array 230 modulate coupled-out light beams 204 to provide the modulated, different color, light beams 202 that are or represent pixels of the 3D color electronic display 200. Moreover, different ones of the modulated, different color light beams 202 may correspond to different views of the 3D color electronic display 200. In various examples, the light valves of the light valve array 230 may include, but are not limited to, one or more of liquid crystal (LC) light valves, electrowetting light valves and electrophoretic light valves. Dashed lines are used in FIG. 5 to emphasize modulation of the light beams 202, by way of example.

The 3D color electronic display 200 further comprises a light source scanner 240. The light source scanner 240 is configured to scan a multicolor light source to produce different colors of light that are to be introduced (e.g., coupled into) the plate light guide 210 as different color bands of guided light. Further, according to various embodiments, each of the different color bands is separated by an intervening dark band. In some embodiments, the light source scanner 240 is configured to scan the multicolor light source to sequentially produce the different colors of light that are introduced into the plate light guide 210. In some embodiments, the light source scanner 240 comprises a color scanning protocol to provide a scanning methodology or procedure for the light source scanner 240. The different color bands may correspond to the substantially parallel bands, strips or regions described above with respect to the color-scanning grating-based backlight 100, according to some embodiments. For example, the different color bands and the intervening dark band may be substantially similar to the regions 112, 114, 118 and intervening dark region 116, 116', respectively, as described above.

According to some embodiments (e.g., as illustrated in FIG. 5), the 3D color electronic display 200 further comprises the multicolor light source 250. The multicolor light source 250 may comprise an array of light emitters or optical emitters (e.g., a linear array) configured to produce the different colors of light. According to various embodiments, the optical emitters may be distributed along and coupled to an edge of the plate light guide 210. As such, the multicolor light source 250 is configured to provide light of different colors that is to propagate in the plate light guide 210 as the guided light. According to various embodiments, the light source scanner 240 may be configured to sequentially scan different color sets of the optical emitters (e.g., a red set, a green set, and a blue set) according to a sequential color scanning protocol to produce the different color bands of guided light within the plate light guide 210.

In some examples, the multicolor light source 250 is substantially similar to the multicolor light source 130 described above with respect to the color-scanning grating-based backlight 100. For example, each of a plurality of optical emitters of the multicolor light source 250 may include an LED of or corresponding to each of a different of primary color (e.g., red, green, blue) of the 3D color electronic display 200. In particular, each optical emitter of the multicolor light source 250 may comprise a red LED, a green LED, and a blue LED. Further, the light source scanner 240 may be configured to sequentially scan through the LEDs of the optical emitters to provide red light, green light and blue light to selected ones of the color bands in the plate light guide 210 according to the sequential color scanning protocol, for example.

According to some embodiments, the color electronic display 200 further includes a frame buffer 260. The frame buffer 260 comprises a block or similar allocation of memory configured to hold or store image information (e.g., 3D color image information). Further, the frame buffer 260 is configured to store the image information during a plurality of cycles of the light valve array 230. The image information is configured to control modulation of the coupled-out light beams 204 by the light valve array 230. Additionally, the cycles of the light valve array 230 correspond to scans by the light source scanner 240.

Herein, a 'cycle' of the light valve array 230 is defined as time that it takes to set the light valves of the array 230 to a particular configuration (e.g., set up time, hold time, etc., of the light valves) corresponding to one of the colors being displayed for a given color image and color model. The time required for setting the light valve array 230 to the particular configuration depends on the particular type of light valve being employed. According to various embodiments, a number of cycles in the cycle plurality may be related to a number of primary colors in a color model being used. For example, with a red-green-blue (RGB) color model, it generally takes three cycles of the light valve array 230 to display a full color image (i.e., one cycle for each of red, green and blue of the RGB color model).

According to various embodiments, the memory of the frame buffer 260 may include, but is not limited to, random access memory (RAM), read only memory (ROM), and flash memory. In some embodiments, the frame buffer 260 may be implemented as a hardware module located adjacent to and directly interconnected with the light valve array 230. The frame buffer 260 may be controlled by the light source scanner 240, according to some embodiments. For example, the light source scanner 240 may control how and when the frame buffer 260 provides data to activate the light valves of the light valve array 230.

Figure 6:
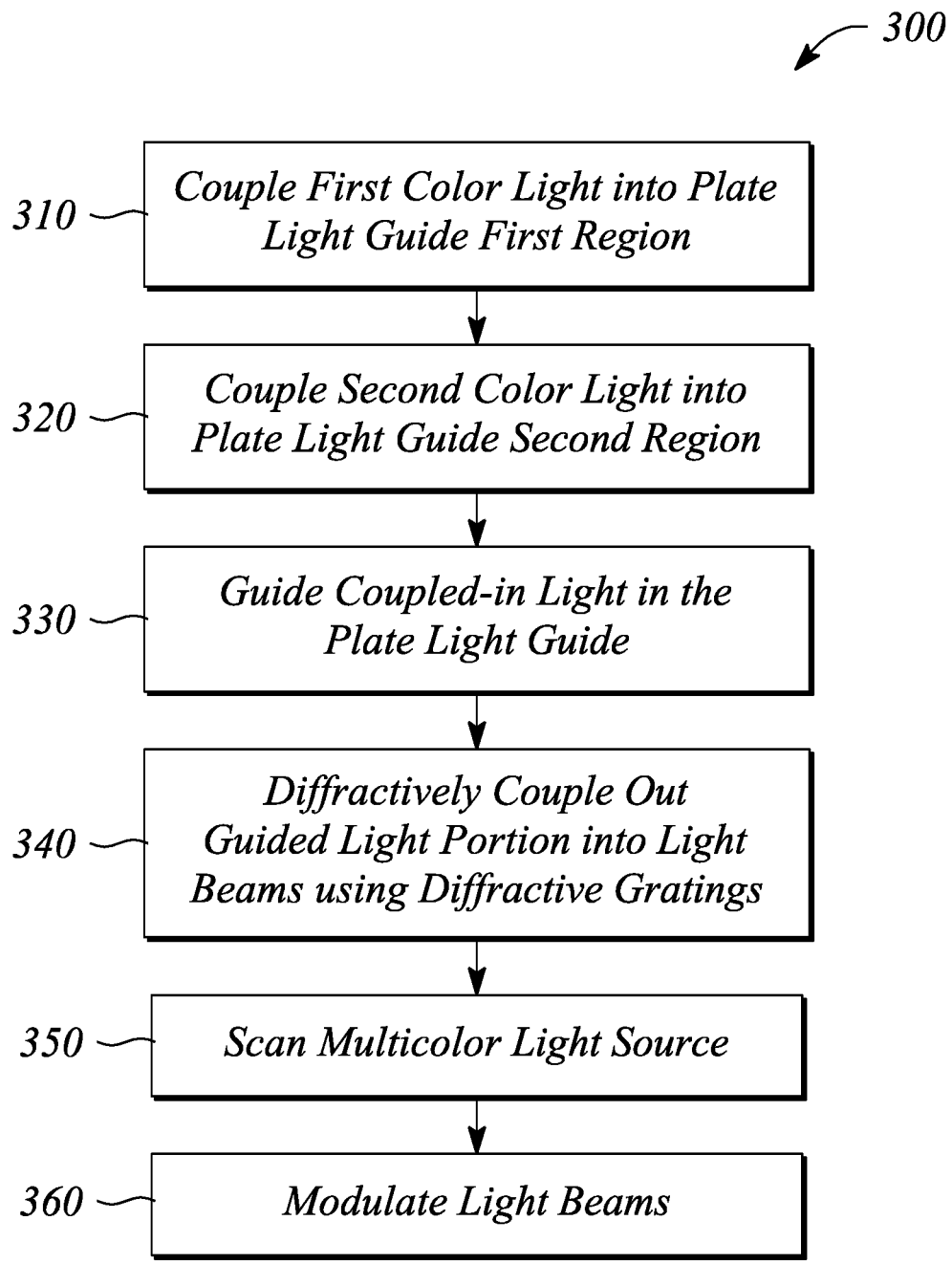
FIG. 6 illustrates a flow chart of a method of color electronic display operation in an example, according to an embodiment consistent with the principles described herein.

According to some examples of the principles described herein, a method of color electronic display operation is provided. FIG. 6 illustrates a flow chart of a method 300 of color electronic display operation in an example, according to an embodiment consistent with the principles described herein. As illustrated, the method 300 of color electronic display operation comprises coupling 310 light of a first color into a first region of a plate light guide. The method 300 of color electronic display operation further comprises coupling 320 light of a second color into a second region of the plate light guide. The second region is separated from the first region by one or both of a dark region of the plate light guide having no coupled-in light and a light-confining wall of the plate light guide. The regions may be substantially parallel strips or bands across a width of the plate light guide, according to some embodiments. The first, second and dark regions may be substantially similar to the first region 112, the second region 114 and the dark region 116 illustrated in FIGS. 3A-3D of the color-scanning grating-based backlight 100 described above, for example.

The method 300 of color electronic display operation illustrated in FIG. 6 further comprises guiding 330 the coupled-in light of the first and second colors along the plate light guide in the respective first and second regions as guided light. In some embodiments, the light guide and the guided light may be substantially similar to the plate light guide 110 and the guided light beam 104, described above with respect to the color-scanning grating-based backlight 100. In particular, in some embodiments, the light guide may guide 330 the guided light of the first and second colors according to total internal reflection as a beam of light. The light beam may be guided 330 at a non-zero propagation angle and may also be collimated, for example. Further, the light guide may be a substantially planar dielectric optical waveguide (e.g., a plate light guide), in some embodiments.

The method 300 of color electronic display operation further includes diffractively coupling out 340 a portion of the guided light of the first and second regions using diffraction gratings at a surface of the plate light guide. Diffractively coupling out 340 is configured to produce respective first color light beams and second color light beams emitted from the plate light guide and directed away from the plate light guide in various and sometimes different principal angular directions. In particular, in embodiments that use multibeam diffraction gratings, a coupled-out light beam of the respective color light beam plurality may have a different principal angular direction from other coupled-out light beams of the respective color light beam plurality.

According to various examples, the diffraction gratings located at a surface of the light guide may be formed in the surface of the light guide as grooves, ridges, etc. In other examples, the diffraction gratings may include a film on the light guide surface. In some examples, the diffraction gratings are substantially similar to the diffraction grating 120 described above with respect to the color-scanning grating-based backlight 100. In particular, the diffraction grating may be a multibeam diffraction grating 120 configured to produce a plurality of light beams from the diffractively coupled out 340 portions of the guided light. The multibeam diffraction grating may be substantially similar to the multibeam diffraction grating 120 described above including, but not limited to, being a chirped diffraction grating comprising one of curved grooves and curved ridges that are spaced apart from one another. In other examples, the diffraction grating is located elsewhere including, but not limited to, within the light guide.

According to some embodiments, the light beams of the light beam plurality may correspond to pixels of the color electronic display. In particular, when the multibeam diffraction grating is employed in diffractively coupling out 340, the plurality of coupled-out light beams of the first color may be directed away from the plate light guide in a plurality of different principal angular directions corresponding to different views of a three-dimensional (3D) electronic display. Moreover, the plurality of coupled-out light beams of the second color may be directed away from the plate light guide in a plurality of different principal angular directions corresponding to the different views of the three-dimensional (3D) electronic display. In particular, the plurality of second color, coupled-out light beams may have a plurality of different principal angular directions that correspond to the different principal angular directions of the first color, coupled-out light beams. As such, the color electronic display may be a 3D color electronic display.

In some embodiments, the method 300 of color electronic display operation further comprises scanning 350 a multicolor light source comprising an optical emitter producing the first color and an optical emitter producing the second color. The first color and the second color may be members of a set of primary colors of the color electronic display (e.g., red, green and blue), for example. The optical emitters may be light-emitting diodes (LEDs) of different colors (e.g., a red LED, a green LED and a blue LED), for example. Scanning 350 the multicolor light source may comprise activating the first color optical emitter (e.g., turning on a first LED), activating the second color optical emitter (e.g., turning on a second LED), and interspersing the dark region between the activated first and second light emitters, according to various embodiments. Interspersing the dark region may comprise deactivating an activated optical emitter (e.g., turning off an LED) to correspond to the dark region, for example.

In some embodiments, the method 300 of color electronic display operation further includes modulating 360 the light beams of the respective plurality of coupled-out light beams using a plurality of light valves. In particular, the plurality of coupled-out light beams is modulated 360 by passing through or otherwise interacting with a corresponding plurality of light valves. The modulated light beams may form the pixels of the color electronic display (e.g., the 3D electronic display), according to some embodiments. For example, the modulated 360 light beams may provide a plurality of views of the 3D color electronic display (e.g., a glasses-free, 3D electronic display).

In some examples, the plurality of light valves used in modulating 360 the plurality of light beams is substantially similar to the light valve array 230 described above with respect to the 3D color electronic display 200. For example, the light valves may include liquid crystal light valves. In another example, the light valves may be another type of light valve including, but not limited to, an electrowetting light valve and an electrophoretic light valve.

Thus, there have been described examples of a color-scanning grating-based backlight, a 3D color electronic display and a method of color electronic display operation that employ color scanning. It should be understood that the above-described examples are merely illustrative of some of the many specific examples and embodiments that represent the principles described herein. Clearly, those skilled in the art can readily devise numerous other arrangements without departing from the scope as defined by the following claims.

What is claimed is:

1. A color-scanning grating-based backlight comprising:
   a plate light guide configured to guide a beam of light;
   a diffraction grating configured to diffractively couple out a portion of the guided light beam as a coupled-out light beam directed away from a surface of the plate light guide at a predetermined principal angular direction; and
   a multicolor light source configured to provide light to the plate light guide as the guided light beam according to a color scanning protocol,
   wherein provided light of a first color in a first region of the plate light guide is separated from provided light of a second color in a second region of the plate light guide one or both of by an intervening dark region of the plate light guide and by a light-confining wall of the plate light guide.

2. The color-scanning grating-based backlight of claim 1, wherein the diffraction grating comprises a multibeam diffraction grating configured to couple out the portion of the guided light beam as a plurality of coupled-out light beams, a light beam of the plurality of coupled-out light beams having a different principal angular direction from other light beams of the coupled-out light beam plurality.

3. The color-scanning grating-based backlight of claim 2, wherein the multibeam diffraction grating is a linearly chirped diffraction grating.

4. The color-scanning grating-based backlight of claim 2, wherein the plurality of coupled-out light beams having different principal angular directions form a light field configured to provide pixels corresponding to different views of a three dimensional (3D) color electronic display.

5. The color-scanning grating-based backlight of claim 1, wherein the multicolor light source comprises a plurality of light-emitting diodes, the light-emitting diodes of the plurality representing different colors of a plurality of primary colors.

6. The color-scanning grating-based backlight of claim 5, wherein the primary colors of light comprise red light, green light and blue light.

7. The color-scanning grating-based backlight of claim 1, wherein the first region, the second region and the intervening region of the plate light guide comprise substantially parallel bands across a width the plate light guide, the multicolor light source being located at and coupled to an edge of a first end of the plate light guide, the bands extending along a length of the plate light guide from adjacent the first end to an opposite second end of the plate light guide in a propagation direction of the guided light beam.

8. The color-scanning grating-based backlight of claim 1, wherein the color scanning protocol is configured to selectively scan through different colors of the multicolor light source in a sequential manner to provide the first region, the second region and the intervening dark region of the plate light guide.

9. An electronic display comprising the color-scanning grating-based backlight of claim 1, the electronic display further comprising a light valve configured to modulate the coupled-out light beam, the diffraction grating being at the surface of the light guide that is adjacent to the light valve, wherein the modulated, coupled-out light beam corresponds to a pixel of the electronic display.

10. A three-dimensional (3D) color electronic display employing a color scanning protocol comprising:
    a plate light guide;
    an array of multibeam diffraction gratings at a surface of the plate light guide, a multibeam diffraction grating of the array being configured to diffractively couple out a portion of light guided within the plate light guide as plurality of coupled-out light beams having different principal angular directions representing different views of the 3D color electronic display;
    a light valve array configured to modulate the coupled-out light beams, the modulated coupled-out light beams representing pixels corresponding to the different views; and
    a light source scanner configured to scan a multicolor light source to sequentially produce different colors of light for respective periods of time, the different colors of light to be introduced into the plate light guide as different color bands of guided light,
    wherein each of the different color bands is separated by an intervening dark band.

11. The 3D color electronic display of claim 10, wherein the plate light guide is configured to guide light as a collimated light beam at a non-zero propagation angle within the plate light guide.

12. The 3D color electronic display of claim 10, wherein the plate light guide comprises light-confining walls configured to confine guided light within a strip of the plate light guide bounded by the light-confining walls.

13. The 3D color electronic display of claim 10, wherein the multibeam diffraction grating is a chirped diffraction grating comprising one of curved grooves and curved ridges that are spaced apart from one another.

14. The 3D color electronic display of claim 10, further comprising the multicolor light source comprising a linear array of optical emitters to produce the different colors of light, the optical emitters being distributed along a width of the plate light guide and being coupled to an edge of the plate light guide, wherein the light source scanner is configured to sequentially scan different sets of the optical emitters according to a sequential color scanning protocol of the different colors to produce the different color bands of the guided light.

15. The 3D color electronic display of claim 14, wherein a first set of the optical emitters comprises a red light-emitting diode, a second set of the optical emitters comprises a green light-emitting diode, and a third set of the optical emitters comprises a blue light-emitting diode, the light source scanner being configured to sequentially scan through the first, second and third sets of optical emitters to provide red light, green light and blue light to selected ones of the color bands in the plate light guide according to the sequential color scanning protocol.

16. The 3D color electronic display of claim 10, wherein the light valve array comprises a plurality of liquid crystal light valves.

17. The 3D color electronic display of claim 10, further comprising a frame buffer configured to store image information to be displayed by the 3D color electronic display, the frame buffer to store the image information during a plurality of cycles of the light valve array, wherein the image information is configured to control the coupled-out light beam modulation, the plurality of cycles corresponding to scans by the light source scanner.

18. A method of color electronic display operation, the method comprising:
coupling light of a first color into a first region of a plate light guide;
coupling light of a second color into a second region of the plate light guide, the second region being separated from the first region by one or both of a dark region of the plate light guide having no coupled-in light and a light-confining wall of the plate light guide, the regions being across a width of the plate light guide;
guiding the coupled-in light of the first and second colors along the plate light guide in the respective first and second regions as guided light; and
diffractively coupling out a portion of the guided light of the first and second regions using a diffraction grating at a surface of the plate light guide to produce respective first and second light beams directed away from the plate light guide in predetermined principal angular directions.

19. The method of color electronic display operation of claim 18, wherein diffractively coupling out a portion of the guided light comprises employing a multibeam diffraction grating to produce a plurality of coupled-out light beams of the first and second colors that are directed away from the plate light guide in a plurality of different principal angular directions corresponding to different views of a 3D electronic display.

20. The method of color electronic display operation of claim 19, wherein the multibeam diffraction grating is a linearly chirped diffraction grating comprising one of curved grooves and curved ridges that are spaced apart from one another.

21. The method of color electronic display operation of claim 19, further comprising modulating the plurality of light beams using a plurality of light valves, the modulated light beams forming pixels of the 3D electronic display corresponding to the different views.

22. The method of color electronic display operation of claim 18, further comprising scanning a multicolor light source that comprises an optical emitter producing the first color light and an optical emitter producing the second color light, wherein scanning the multicolor light source comprises activating the first color optical emitter to illuminate the first region, activating the second color optical emitter to illuminate the second region, and interspersing the dark region between the activated first and second optical emitters.

23. The method of color electronic display operation of claim 18, wherein the light-confining wall comprises a total internal reflection (TIR) wall.

\* \* \* \* \*